(12) United States Patent
Ganesan

(10) Patent No.: US 10,936,822 B2
(45) Date of Patent: Mar. 2, 2021

(54) LINGUISTIC SEMANTIC ANALYSIS ALERT CORRELATION SYSTEM

(71) Applicant: Dell Products L.P., Round Rock, TX (US)

(72) Inventor: Vaideeswaran Ganesan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 15/971,806

(22) Filed: May 4, 2018

(65) Prior Publication Data
US 2019/0340241 A1 Nov. 7, 2019

(51) Int. Cl.
| | | |
|---|---|---|
| G10L 15/22 | (2006.01) | |
| G06F 40/30 | (2020.01) | |
| G06K 9/62 | (2006.01) | |
| G06F 40/242 | (2020.01) | |
| G06F 40/247 | (2020.01) | |
| G06F 40/263 | (2020.01) | |

(52) U.S. Cl.
CPC ............ *G06F 40/30* (2020.01); *G06F 40/242* (2020.01); *G06F 40/247* (2020.01); *G06F 40/263* (2020.01); *G06K 9/6267* (2013.01)

(58) Field of Classification Search
CPC ............... G10L 15/22; G06F 8/51; G06F 8/76
USPC .............. 704/9; 717/107; 707/114, 121, 143
See application file for complete search history.

(56) References Cited

U.S. PATENT DOCUMENTS

| | | | | |
|---|---|---|---|---|
| 8,890,676 B1* | 11/2014 | Heath | ................... | G08B 29/188 340/3.1 |
| 9,356,883 B1* | 5/2016 | Borthakur | ........... | H04L 41/5025 |
| 2006/0031473 A1* | 2/2006 | Wood | ................... | H04L 41/0631 709/224 |
| 2006/0123007 A1* | 6/2006 | Aaron | ...................... | H04L 63/20 |
| 2008/0091406 A1* | 4/2008 | Baldwin | ................. | G10L 15/22 704/4 |
| 2011/0261701 A1* | 10/2011 | Coates | ................... | H04L 43/065 370/242 |
| 2012/0116836 A1* | 5/2012 | Flores | ................. | G06Q 10/0633 705/7.27 |

(Continued)

OTHER PUBLICATIONS

"Alert Consolidation," IBM Knowledge Center—Alert Consolidation, 2005, 2 Pages, http://www.ibm.com/support/knowledgecenter/en/SS6QYM_9.2.0/com.ibm.help.prod.concepts.doc/c_AlertConsolidation.html.

*Primary Examiner* — Jakieda R Jackson
(74) *Attorney, Agent, or Firm* — Haynes and Boone, LLP

(57) ABSTRACT

A linguistic semantic alert correlation analysis system includes a storage system storing alert dictionary databases that include domain-specific language information that identifies domain-specific language terms utilized in providing alerts within different domains. A linguistic semantic alert correlation analysis engine is coupled to the at least one storage device, and receives alert catalogs that are each utilized one of the different domains. The domain specific language terms are used to classify alerts in each of the alert catalogs and, based on the classification, determine that a first alert in a first alert catalog and a second alert in a second alert catalog are each associated with a common subsystem. Based on the first alert and the second alert being associated with the common subsystem, the first alert and the second alert are correlated such that each is associated with the common subsystem.

20 Claims, 4 Drawing Sheets

(56) References Cited

U.S. PATENT DOCUMENTS

| | | | | |
|---|---|---|---|---|
| 2014/0278405 A1* | 9/2014 | Peters | ............... | G06F 16/345 |
| | | | | 704/235 |
| 2015/0348551 A1* | 12/2015 | Gruber | ............... | G10L 15/28 |
| | | | | 704/235 |
| 2016/0034571 A1* | 2/2016 | Setayesh | ............ | G06F 16/353 |
| | | | | 707/738 |
| 2017/0186427 A1* | 6/2017 | Wang | ............... | G06F 3/167 |
| 2017/0351272 A1* | 12/2017 | Rasheed | ............ | G05D 7/0676 |

* cited by examiner

LINGUISTIC SEMANTIC ANALYSIS ALERT CORRELATION SYSTEM

BACKGROUND

The present disclosure relates generally to information handling systems, and more particularly to the use of linguistic semantic analysis to correlated alerts provided in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage devices, networking devices, and/or other computing devices, utilize applications that interact with the hardware and software in the computing devices. However, the integration of applications for use with computing devices raises some issues. For example, a computing device manufacturer may integrate applications with their computing devices that monitor the hardware and software in those computing devices, which typically involves identifying the systems management artifacts developed for the hardware (e.g., Management Information Bases (MIBs), profiles, schemas, Representational State Transfer (REST) interfaces, Application Programming Interfaces (APIs), etc.), and writing code that integrates those system management artifacts with the applications. However, such activities are time intensive, as significant effort is involved in understanding and analyzing the meaning of elements utilized by the system management artifacts. Furthermore, requests for application integration are frequent, and the time intensive process discussed above prevents may of those requests from being satisfied. Further still, even when such requests are filled, integrating applications to operate with current computing device firmware is associated with the same issues, and thus even integrated applications will quickly fail to operate with all available firmware functionality. Providing support for new computing device products presents similar issues, as even when a computing device product is provided with a library (e.g., a Python or Powershell library), application integration requires those libraries be studied to understand the meaning of their terms, and write "glue" logic to integrate them to operate with those applications.

For example, monitoring software such as, for example, Nagios software available at www.nagios.org, System Center Operations Manager (SCOM) available from MICROSOFT® of Redmond, Wash., United States, and Zabbix software available at www.zabbix.com, provide for the monitoring of inventory, performance metrics, configurations, health information, and operational information associated with computing devices. Alerts that are based upon such monitoring and that notify users as to what is happening in the computing device are a significant source of information for the computing device. However, a single situation occurring in the computing device (e.g., a fan failure) can trigger alerts associated with multiple related components (e.g., a temperature alert, a processor alert, etc.) Conventionally, computing device manufacturers attempt to correlate such alerts provided by monitoring software by providing code blocks and rules that are utilized to identify correlations, but such activities require human intervention for any monitoring software under consideration. It has been proposed to utilize machine learning techniques to do causal analysis based on large amounts of contextual information, which requires a large corpus of information to provide accurate analysis.

Accordingly, it would be desirable to provide for alert correlation for monitoring software provided on computing devices.

SUMMARY

According to one embodiment, an Information Handling System (IHS) includes a processing system; and a memory system that is coupled to the processing system and that includes instructions that, when executed by the processing system, cause the processing system to provide a linguistic semantic analysis alert correlation engine that is configured to: receive a plurality of alert catalogs that are each utilized one of a plurality of different domains; classify, using domain specific language terms included in domain-specific language information stored in one or more alert dictionary databases that, alerts in each of the plurality of alert catalogs; determine, based on the classification of the alerts, that a first alert in a first alert catalog and a second alert in a second alert catalog are each associated with a common subsystem; and correlate, based on the first alert and the second alert being associated with the common subsystem, the first alert and the second alert such that each of the first alert and the second alert are associated with the common subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
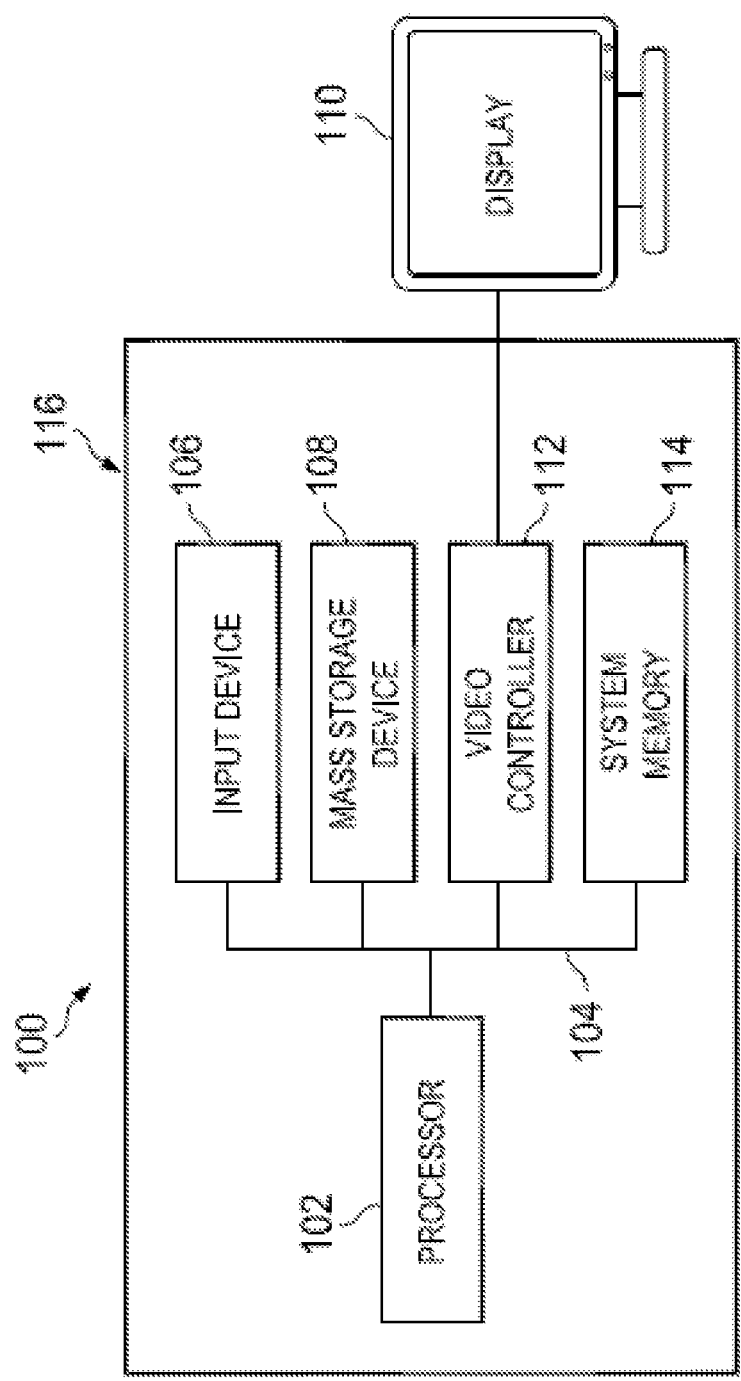
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
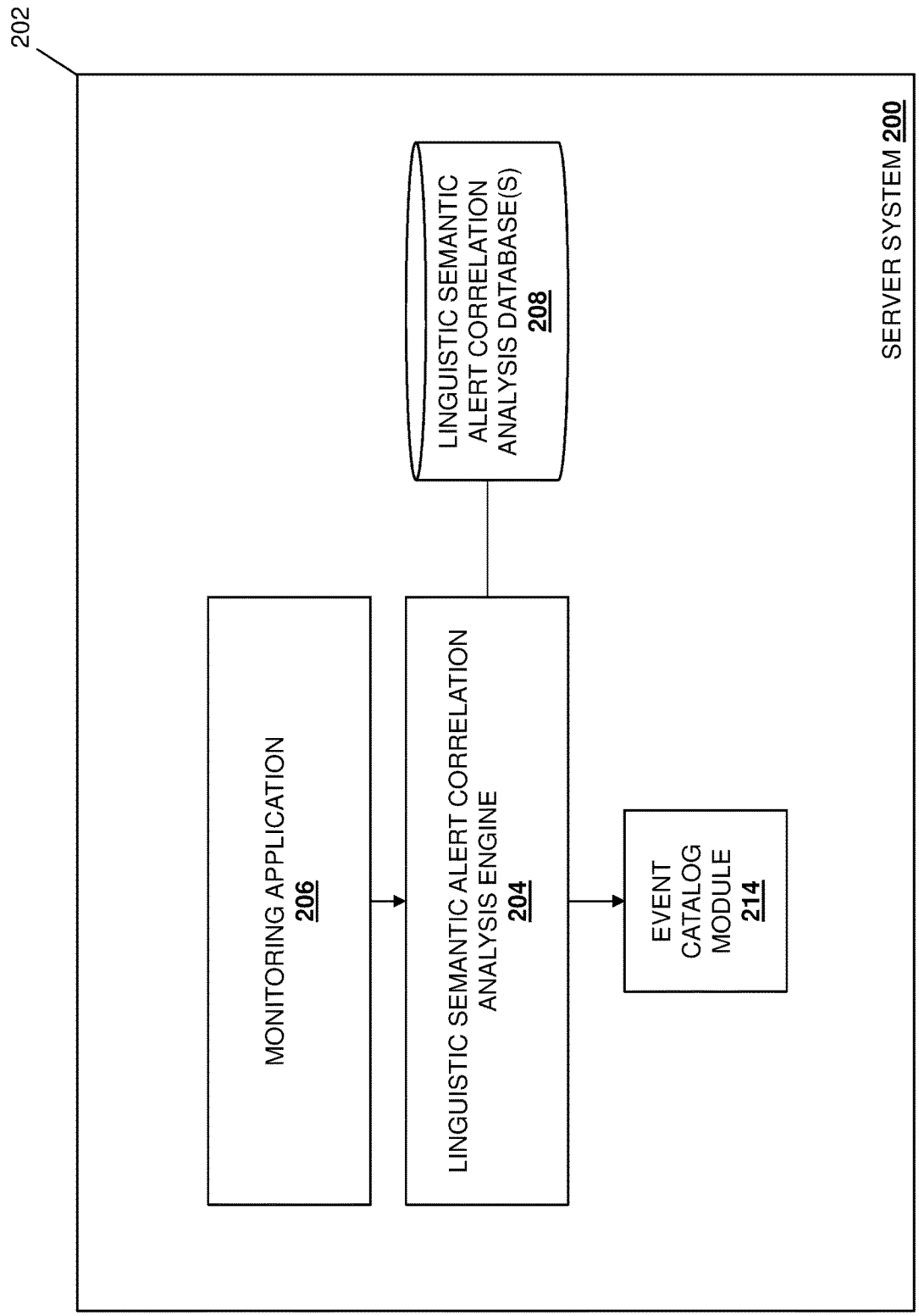
FIG. 2 is a schematic view illustrating an embodiment of a server system.

Referring now to FIG. 2, an embodiment of a server system 200 is illustrated. In an embodiment, the server system 200 may be provided by the IHS 100 discussed above with reference to FIG. 1, or may include some or all of the components of the IHS 100. In a specific embodiment, the server system 200 is provided by a single server device, although multiple server devices may provide the server system while remaining within the scope of the present disclosure as well. In the illustrated embodiment, the server system 200 includes a chassis 202 that houses the components of the server system 200, only some of which are illustrated in FIG. 2. For example, the chassis 202 may house a processing system (not illustrated, but which may include the processor discussed above with reference to FIG. 1) and a memory system (not illustrated, but which may include the memory 114 discussed above with reference to FIG. 1) that includes instructions that, when executed by the processing system, cause the processing system to provide a linguistic semantic analysis alert correlation engine 204 that is configured to perform the functions of the linguistic semantic analysis alert correlation engines and/or server systems discussed below.

The chassis 202 may also house a memory system (not illustrated, but which may include the memory 114 discussed above with reference to FIG. 1) that includes a monitoring application 206. In some embodiments, the monitoring application 206 may be provided by a development operations application. As would be understood by one of skill in the art, development operations is a software engineering culture and practice that aims at unifying software development and software operation to shorten application development cycles, increase application deployment frequency, and provide more dependable application releases. Thus, while a variety of monitoring applications may benefit from the teachings of the present disclosure, the systems and methods described herein have been found to provide particular benefits for monitoring provided by development operations applications that are released relatively faster and more frequently compared to other types of monitoring applications. In a specific example, development operations applications may include Nagios software, SCOM software, Zabbix software, and/or a variety of other devops software that would be apparent to one of skill in the art in possession of the present disclosure.

The chassis 202 may also house a storage system (not illustrated, but which may include the storage device 108 discussed above with reference to FIG. 1) that includes one or more linguistic semantic analysis alert correlation databases 208. As discussed below, the linguistic semantic analysis alert correlation database(s) 208 may include domain-specific programming language information that identifies domain-specific programming language terms utilized in providing the monitoring application 206. In an embodiment, the linguistic semantic analysis alert correlation database(s) 208 may include a domain-specific dictionary with nouns (or noun combinations) and verbs that are specific to a domain or other target system that is monitored by the monitoring application 206. For example, such a domain or target system may include the integrated Dell Remote Access Controller (iDRAC) available from DELL®, Inc. of Round Rock, Tex., United States, the WINDOWS® operating system available from MICROSOFT® Corporation of Redmond, Wash., United States, and/or other domain or target systems that would be apparent to one of skill in the art in possession of the present disclosure as well. In a specific example, domain-specific dictionaries provided according to the teachings of the present disclosure may include nouns or noun combinations such as "server configuration profile", "server profile", "factory inventory", "virtual disk", "physical disk", "light emitting device (LED)", "share", "credentials", "username", "password", "provisioning array", and "fast policy". In another specific example, domain-specific dictionaries provided according to the teachings of the present disclosure may include verbs such as "export", "import", "create", "modify", "delete", "set", "find", "get", "blink", "unblink", and "process".

In an embodiment, the linguistic semantic analysis alert correlation database(s) 208 may include domain-specific component trees and/or other computing device information that identifies components in a domain or target system that is configured to execute the monitoring application 206. For example, for a server that is configured to execute the monitoring application 206, domain-specific component trees provided according to the teachings of the present disclosure may include "processor-memory-Redundant Array of Independent Disks (RAID)-system-iDRAC", while for a provisioning array that is configured to execute the monitoring application 206, the domain-specific component trees provided according to the teachings of the present disclosure may include "volume-pool". In an embodiment, the linguistic semantic analysis alert correlation database(s) 208 may include a domain-specific thesaurus that may include synonyms, antonyms, and state cycles. In a specific example, synonyms in a domain-specific thesaurus provided according to the teachings of the present disclosure may include "set=modify=change=configure", "get=find", and "delete=remove". In another specific example, antonyms in a domain-specific thesaurus provided according to the teachings of the present disclosure may include "export-import", "create-delete", and "blink-unblink". In yet another specific example, state cycles in a domain-specific thesaurus provided according to the teachings of the present disclosure may include "create-get-set-delete" and "blink-unblink".

In addition, a domain-specific thesaurus provided according to the teachings of the present disclosure may include direction information for its included terms. For example, such direction information may indicate that terms such as "import", "set", and "create" are provided to the domain or target system, while terms such as "export", "get", and "find" are provided from the domain or target system. One of skill in the art in possession of the present disclosure will recognize that some terms (e.g., "process") may not have any direction information. While several specific examples of linguistic semantic analysis alert correlation database information has been described, one of skill in the art in possession of the present disclosure will recognize that any terms and/or information utilized in the monitoring application and/or the domain/target system that executes it, may be included in the linguistic semantic analysis alert correlation database(s) 208 while remaining within the scope of the present disclosure.

The chassis 202 may also house a plurality of alert modules such as, for example, the event catalog module 214 illustrated in FIG. 2. As discussed in further detail below, alert module(s) may represent modules that are to be utilized with the monitoring application 206 when it is executed on the domain/target system to provide alerts. As such, the alert module(s) may include updates, releases, and/or other modifications that are to-be correlated and/or consolidated with regards to the monitoring application 206. As discussed in further detail below, the linguistic sematic alert correlation analysis engine 204 utilizes the linguistic semantic alert correlation analysis database(s) 208, and in some cases the monitoring application 206 itself, to derive correlation information for alerts with respect to particular subsystems, and consolidate alerts for common subsystems. While a specific server system has been described, one of skill in the art in possession of the present disclosure will understand that server systems may include a variety of other components and/or component configurations for providing conventional server system functionality, as well as the functionality discussed below, while remaining within the scope of the present disclosure.

Figure 3:
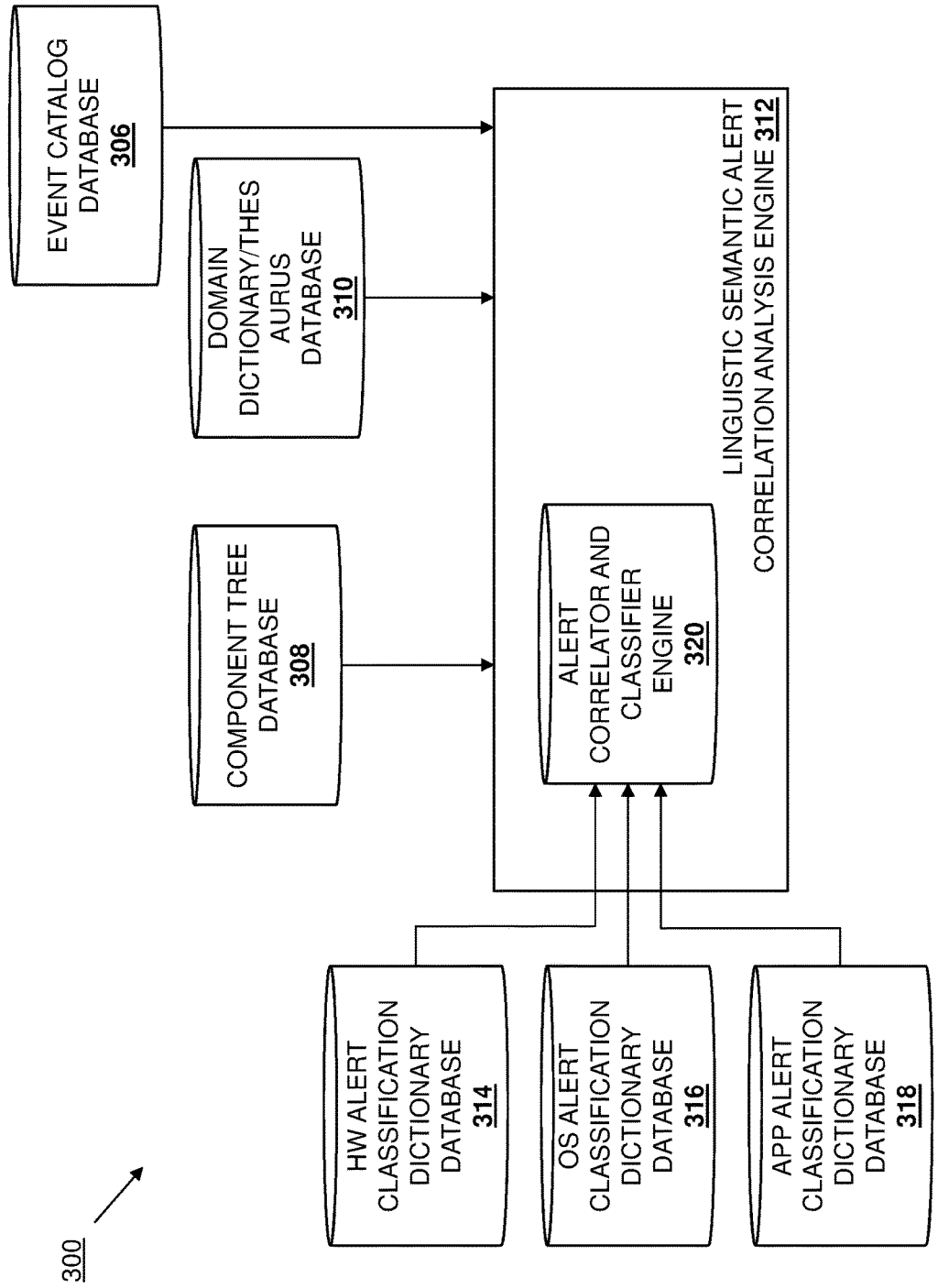
FIG. 3 is a schematic view illustrating an embodiment of the server system of FIG. 2A.

Referring now to FIG. 3, an embodiment of a server system 300 is illustrated that may be the server system 200 discussed above with reference to FIG. 2, and is provided for discussion in the examples below. As can be seen, any of an event catalog database 306, a component tree database 308, and a domain-specific dictionary/thesaurus database 310 may provide information to a linguistic semantic alert analysis engine 312. The linguistic semantic monitoring analysis engine 312 also receives information from a hardware alert classification dictionary database 314, an operating system alert classification dictionary database 316, and an application alert classification dictionary database 318, and provides an alert correlation and classifier engine 320 that uses the information from the databases 306, 308, 310, 314, 316, and 318 to classify and correlate alerts.

In a specific example for an integrated DELL® Remote Access Controller (iDRAC), the event catalog database 306 may store any or all of the following information in the table below:

| Component | Error # | Message | Causes and Resolution | Severity |
|---|---|---|---|---|
| PSU | 4233 | <PSU Sensor Name> has failed. | Cause: Power supply is failed. Resolution: Check the power supply assembly and switch on the power supply. | Critical |
| PSU | 4234 | <PSU Sensor Name> is switched OFF. | Cause: Power supply is turned off or A/C power is turned off Resolution: Turn on the A/C power and Power Supply. | Warning |
| PSU | 4235 | <PSU sensor name> is on. | | Informational |
| PDR | 2299 | Physical Disk <number> is operating normally | | Informational |
| PDR | 2297 | Fault detected on Physical disk <number>. Physical disk has failed | Cause: Drive failed due to hardware failure. Resolution: Replace the failed disk | Critical |
| VDR | 4355 | <virtual disk> has returned to normal state | | Informational |
| VDR | 4356 | Redundancy of Virtual disk has degraded | Cause: One or more of physical disks must have failed. Resolution: Replace the failed physical disk and rebuild the virtual disk. | Warning |
| VDR | 4357 | Virtual disk failed | Cause: Virtual disk has failed. Resolution: Contact Dell to recover data from the virtual disk | Critical |

-continued

| Component | Error # | Message | Causes and Resolution | Severity |
|---|---|---|---|---|
| Current | 2178 | The system board <name> current is within range. | | Healthy |
| Current | 2179 | The system board ... <name> current is less than the lower warning threshold. | | Warning |
| Current | 2179 | The system board ... <name> current is greater than the upper warning threshold. | | Warning |
| Current | 2180 | The system board ... <name> current is less than the lower critical threshold. | | Critical |
| Current | 2180 | The system board ... <name> current is greater than the upper critical threshold. | | Critical |

In another specific example for an iDRAC, nouns in the dictionary database 310 may include "physical disk", "virtual disk", "PSU sensor name", and/or other nouns that would be apparent to one of skill in the art in possession of the present disclosure.

In a specific example for a WINDOWS® operating system, the event catalog database 306 may include the following information in the table below:

| Event Source | Event ID # | Message | Causes and Resolution | Severity |
|---|---|---|---|---|
| System | 1501 | Power Supply <object> has failed. | ... | Critical |
| System | 1502 | Power Supply <object> has degraded | ... | Warning |
| System | 1503 | Power Supply <object> is healthy. | | Informational |
| System | 105 | Physical Drive <number> is good | | Informational |
| System | 106 | Physical Drive <number> is failed | ... | Critical |

In another specific example for a WINDOWS® operating system, nouns in the dictionary database 310 may include "physical drive", "power supply", and/or other nouns that would be apparent to one of skill in the art in possession of the present disclosure.

In another specific example for an iDRAC, the component tree database 308 may include information based on iDRAC naming conventions. As would be understood by one of skill in the art in possession of the present disclosure, the iDRAC has its own naming conventions to identify components inside the system. For example, in a server ("server.host.com"), there may be a storage subsystem with two physical disks ("PD.1" and "PD.2") that are contained in an enclosure ("ENCL.1"), which is in turn managed by a controller ("CNTRL.1") that is present inside the storage subsystem of the server. In such an example, component tree information may be created that identifies "Server.host.com (System) contains CNTRL.1 contains ENCL.1 contains (PD.1, PD.2)".

In another specific example for a WINDOWS® operating system, the component tree database 308 may include information based on WINDOWS® operating system naming conventions. Continuing the example above with the iDRAC, the WINDOWS® operating system has its own naming conventions to identify components in the server. For example, the two physical disks ("PD.1" and "PD.2") in the storage subsystem of the server may be identified as ".\Device\PhysicalDrive.1" and ".\Device\PhysicalDrive.2". Furthermore, the enclosure ("ENCL.1") may not be visible to the server, but the Controller is ("CNTRL.1") may be visible to the server and may be identified as ".\Device\RAIDController". In such an example, component tree information may be created that identifies "Server.host.com (System) contains ".\Device\RAIDController" contains (".\Device\PhysicalDrive.1", ".\Device\PhysicalDrive.2")"

Figure 4:
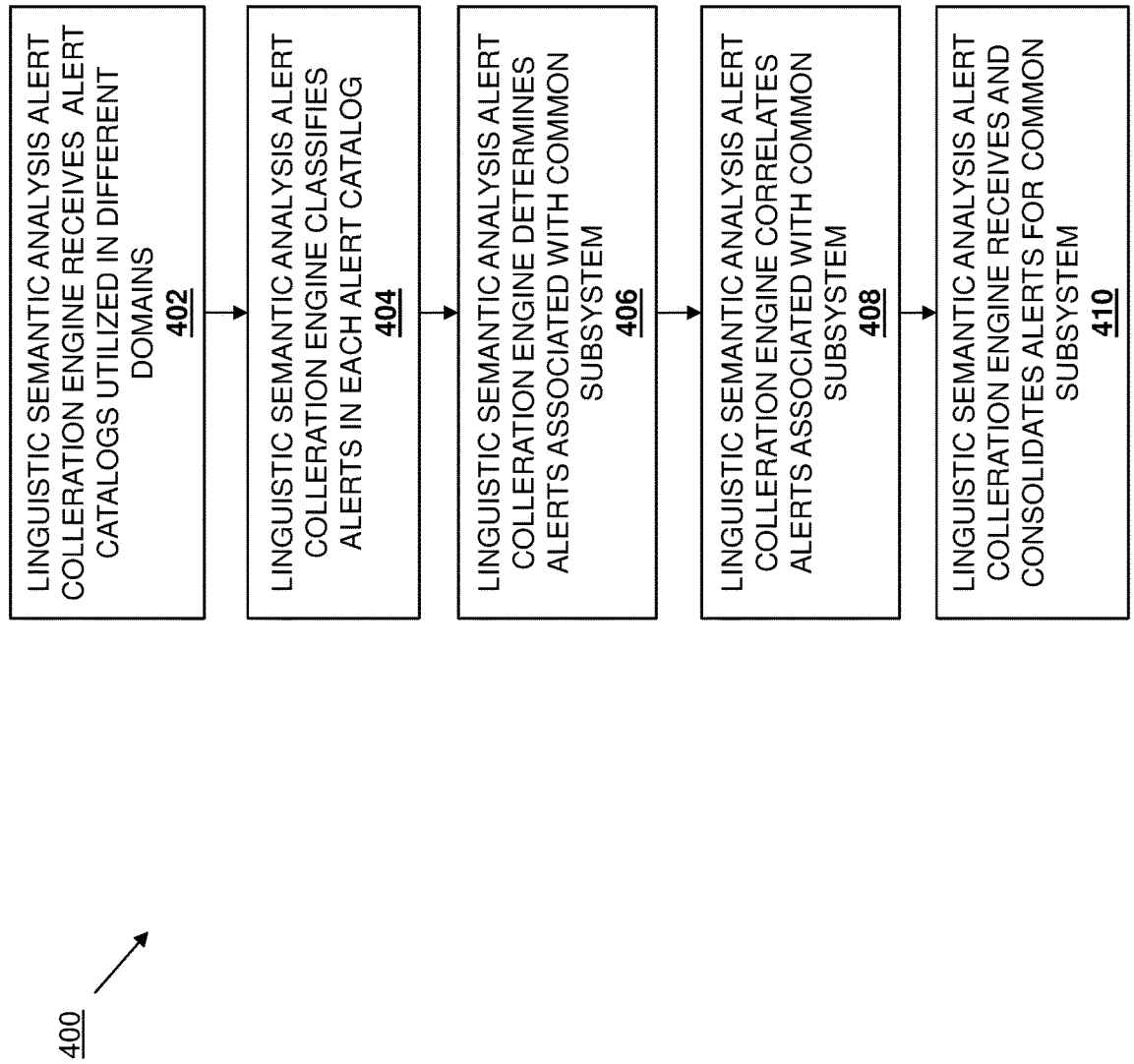
FIG. 4 is a flow chart illustrating an embodiment of a method for correlating alerts using linguistic semantic analysis.

Referring now to FIG. 4, an embodiment of a method 400 for correlating alerts using linguistic semantic analysis is illustrated. As discussed below, the systems and methods of the present disclosure provide for the correlation of alerts for monitoring applications such as development operations applications via the use of dictionaries, thesaurusus, and component trees that identify the semantics and components utilized in the domain/target system in order to perform linguistic semantic analysis on alert catalogs that allows alerts to be associated with particular subsystems, and alerts associated with common subsystems to be correlated and consolidated. The systems and methods of the present disclosure eliminate the need for "hand-coding" blocks and rules that identify correlation characteristics, and may be used to ensure a single situation in a device does not trigger alerts in multiple related subsystems.

In an embodiment, prior to the method 400 of the illustrated embodiment, the linguistic semantic alert correlation analysis database(s) 208 may be provided with the information discussed above with reference to FIGS. 2 and 3. For example, a computing device manufacturer (i.e., of a computing device/domain/target system that is to execute the development operations application 206) may provide the information in the event catalog database 306, the component tree database 308, the domain-specific dictionary/thesaurus database 310, the hardware alert classification dictionary database 314, the operating system alert classification dictionary database 316, the application alert classification dictionary database 318, and/or any of the other databases discussed above. As such, the computing device manufacturer may provide the nouns, noun-combinations, and verbs that define a domain-specific dictionary in the domain-specific dictionary database 310. In addition, the computing device manufacturer may provide the synonyms, antonyms, state-cycles, and direction information that define a domain-specific thesaurus in the domain-specific thesaurus database 310. Furthermore, the computing device manufacturer may provide the component trees and/or other computing device information that defines a domain-specific component trees in the domain-specific component tree database 308. However, while specific information is described herein, one of skill in the art in possession of the present disclosure will recognize that the linguistic semantic alert correlation analysis database(s) 208 may be provided with any information about a domain/target system/computing device that is to be managed by the monitoring application 206.

In some embodiments, the prior to or during the method 400, the linguistic semantic alert correlation analysis engine 204 may operate to determine relationships between different components in a domain/target system/computing device that is configured to execute the monitoring application. For example, applications typically run as services or applications on an operating system, which requires kernel resources such as file descriptors, sockets, disk handles, and/or other kernel resources known in the art. Those kernel resources utilize hardware components such as disks, secure digital (SD) cards, network cards, and/or other hardware components known in the art. The linguistic semantic alert correlation analysis engine 204 may utilize tools such as list-open-files (lsof), process explorers, and/or other kernel tools in order to build relationships between applications, operating system resources, and hardware resources (which may be stored in the hardware alert classification dictionary database 314, the operating system alert classification dictionary database 316, the application alert classification dictionary database 318.) In specific examples, connectivity across servers may be created by building connected ports and eliminating common ports, or identifying file system-partition-physical disk relationships. In an embodiment, the linguistic semantic alert correlation analysis engine 204 may identify and correlate terms that are used differently across application subsystems, OS subsystems, and hardware subsystems (e.g., the term "disk" may also be utilized to identify a "volume".)

The method 400 begins at block 402 where a linguistic semantic alert correlation analysis engine receives alert catalogs utilized in different domains. In an embodiment, at block 402, the linguistic semantic alert correlation analysis engine 204 may receive alert catalogs from the event catalog module 214, and/or any other alert catalog source that would be apparent to one of skill in the art in possession of the present disclosure. For example, at block 402, the linguistic semantic alert correlation analysis engine 204 may load the information from the event catalog database 306 (e.g., the information discussed above for the iDRAC and WINDOWS(S) operating system in the examples above), information from the dictionary database 310 (e.g., the information discussed above for the iDRAC and WINDOWS(S) operating system in the examples above), and/or any other information discussed above into the alert correction engine 320.

The method 400 then proceeds to block 404 where the linguistic semantic alert correlation analysis engine classifies alerts in each alert catalog. In an embodiment, at block 404, the linguistic semantic alert correlation analysis engine 204 may detect relationships across alert categories. For example, it may be determined that a physical disk alert from the iDRAC has a relationship with a physical drive alert in an event log of the WINDOWS® operating system, discussed in further detail below.

The method 400 then proceeds to block 406 where the linguistic semantic alert correlation analysis engine determines alerts associated with common subsystems. In an embodiment, at block 406, the linguistic semantic alert correlation analysis engine 204 may identify whether an alert belongs to a particular subsystem by, for example, analyzing a component tree for the domain (e.g., in the component tree database 308) and comparing components in the component tree with a component instance identification that may be extracted from the alert via word parsing. For example, the linguistic semantic alert correlation analysis engine 204/312 may parse the alert to determine a name utilized for the alert by splitting the alert name into domain-specific language programming language terms stored in the domain dictionary database 310. In a specific example, such domain-specific programming language terms included in the alert names may be identified by reversing the Hungarian notations utilized in the method and property names, splitting the library programming language terms included in the method and property names when a underscore ("_") is identified, and/or using other techniques that would be apparent to one of skill in the art in possession of the present disclosure.

In a specific example, identification/extraction of component instances from an alert at block 306 may be performed by comparing a device type, manufacturer, product type and/or serial number of a component, which will be unique across any system. Continuing with the example of the iDRAC and WINDOWS operating system discussed above, such information may include:

| Component Instance Info | iDRAC Representation | Windows OS Representation |
| --- | --- | --- |
| Device type = 0x0346<br>Manufacturer = Dell Inc<br>Product type = H330<br>Serial Number = SVCTAG1 | Cntrl.1 | ".\Device\RAIDController.1" |
| Device type = 0x25<br>Manufacturer = Samsung<br>Product Type = "Barracuda Green"<br>Serial Number = ABCD3433FDKE | PD.1 | ".\Device\PhysicalDrive.2" |

| Component Instance Info | iDRAC Representation | Windows OS Representation |
|---|---|---|
| Device type = 0x25<br>Manufacturer = Samsung<br>Product Type = "Barracuda Green"<br>Serial Number = ABCD3F493FDGE | PD.2 | ".\Device\PhysicalDrive.1" |

One of skill in the art in possession of the present disclosure will recognize that component ordering may differ from that identified in the table above for the iDRAC and WINDOWS® Operating System. However, one of skill in the art in possession of the present disclosure will appreciate that such component instance identification allows for the accurate mapping of the iDRAC components with the WINDOWS® operating system, as the values above are provided by the Basic Input/Output (BIOS) and thus are the same across both the iDRAC and the WINDOWS operating system.

The method 400 then proceeds to block 408 where the linguistic semantic alert correlation analysis engine correlates alerts associated with a common subsystem. In an embodiment, at block 408, the linguistic semantic alert correlation analysis engine 204 may correlate alerts that are associated with a common subsystem by grouping alerts that have been determined to be generated by an event occurring in their common subsystem.

Continuing with the example of the iDRAC and the WINDOWS® operating system, for common subsystems a cross-domain mapping table may be created with the following information:

| Subsystem | iDRAC Representation | Windows OS Representation |
|---|---|---|
| Physical Disk Controller | Physical Disk Controller | Physical Drive RAID Controller |

The method 400 then proceeds to block 410 where the linguistic semantic alert correlation analysis engine receives and consolidates alerts for the common subsystem(s). In an embodiment, at block 410, the linguistic semantic alert correlation analysis engine 204 may receive a new alert that is related to a particular subsystem, determine if there are existing alerts associated with that subsystem and, if so, close the existing alerts in favor of the new alert. If there are no existing alerts associated with that subsystem, the new alert is associated with that subsystem.

Continuing with the specific example using the iDRAC and the WINDOWS® operating system, the two physical disks ("PD.1" and "PD.2) associated with the iDRAC may generate the following two events:
Alert 1 @ Apr. 25, 2018 10:30 AM: Physical disk PD.1 is operating normally
Alert 2 @ Apr. 25, 2018 3:30 PM: Fault detected on physical disk PD.1. Physical disk has failed
In this example, the linguistic semantic alert correlation analysis engine 204 may parse the alerts into individual words, map those words using the information in the databases 306, 308, and 310, and identify the meaning of the alerts. For example, with the two alerts provided above for the two physical disks ("PD.1" and "PD.2), the following information may be determined:
Alert 1=>physical disk alert=>"normally" refers to a first state in the state cycle, and the event is associated with PD.1.
Alert 2=>physical disk alert=>"failed" refers to a second state in the state cycle that is different than the first state, and the event is associated with PD.1.

Based on the matching of the component ("PD.1") and the instance, the linguistic semantic alert correlation analysis engine 204 may conclude that these two alerts are related to the same instance, but were generated at different points in time, and will assume that Alert 2 is the current situation, whereas Alert 1 was a previous situation and, as such, should be removed or superseded by Alert 2.

In some embodiments, cross-domain matching may be performed for alerts. For example, alerts for an operating system domain and a firmware alert domain may be matched. This may be performed by the linguistic semantic alert analysis engine 204 by identifying equivalence between a component tree for a first domain and a component tree for a second domain (e.g., between an iDRAC and a server), and matching alert files for drivers to firmware alert files (e.g., alert files that include words that have the same meaning.)

Continuing with the specific example using the iDRAC and the WINDOWS® operating system, the two physical disks ("PD.1" and "PD.2".) in the iDRAC may generate the following events:
Alert 1 @ Apr. 25, 2018 10:30 AM: Physical disk PD.1 is operating normally
Alert 2 @ Apr. 25, 2018 3:30 PM: Fault detected on physical disk PD.1. Physical disk has failed
In response to those events, the log in the WINDOWS® operating system may include the following events:
Alert 1 @ Apr. 25, 2018 10:30 AM: Physical drive ".\Device\PhysicalDrive.2" is good
Alert 2 @ Apr. 25, 2018 3:30 PM: Physical drive ".\Device\PhysicalDrive.2" is failed
In this example, the linguistic semantic alert correlation analysis engine 204 may parse the alerts into individual words, map those words using the information in the databases 306, 308, and 310 (e.g., including an iDRAC alert classifier table), and identify the meaning of the alerts. For example, with the two alerts provided above for the two physical disks ("PD.1" and "PD.2), the following information may be determined:
iDRAC Alert 1=>physical disk alert=>"normally" refers to a first state in the state cycle, and the event is associated with PD.1.
iDRAC Alert 2=>physical disk alert=>"failed" refers to a second state in the state cycle that is different than the first state, and the event is associated with PD.1.
The linguistic semantic alert correlation analysis engine 204 may also parse the alerts into individual words, map those words using the information in the databases 306, 308, and 310 (e.g., including a WINDOWS® operating system alert classifier table), and identify the meaning of the alerts. For example, with the two alerts provided above for the two physical disks ("PD.1" and "PD.2), the following information may be determined:

OS Alert 1=>physical drive alert=>"good" refers to a first state in the WINDOWS® operating system state cycle, and the event is associated with ".\Device\PhysicalDrive.2". OS Alert 2=>physical disk alert=>"failed" refers to a second state in the WINDOWS® operating system state cycle that is different than the first state, and the event is associated with ".\Device\PhysicalDrive.2".

Using the component instance identification discuss above, the linguistic semantic alert correlation analysis engine 204 may determine that OS Alert 1 and iDRAC Alert 1 both refer to ".\Device\PhysicalDrive.2", and OS Alert 2 and iDRAC Alert 2 both refer to ".\Device\PhysicalDrive.2". Based on the matching of the component and the instance, the linguistic semantic alert correlation analysis engine 204 may conclude that these two alerts are related to the same instance but reported by two different entities, and will associate both these events appropriately, while retaining only one alert. For example, the OS Alert 1 and OS Alert 2 may be retained, and may subsume the corresponding iDRAC alerts.

Thus, systems and methods have been described that provide for the correlation of alerts for monitoring applications such as development operations applications via the use of dictionaries, thesaurusus, and component trees that identify the semantics and components utilized in the domain/target system in order to perform linguistic semantic analysis on alert catalogs that allows alerts to be associated with particular subsystems, and alerts associated with common subsystems to be correlated and consolidated. The systems and methods of the present disclosure eliminate the need for "hand-coding" blocks and rules that identify correlation characteristics in order to ensure a single situation in a device does not trigger alerts in multiple related subsystems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A linguistic semantic alert correlation analysis system, comprising:
   a plurality of component subsystems;
   a plurality of different domains that include at least one of a hardware component or a software component, that are coupled to the plurality of component subsystems, and that are each configured to detect an event on each of the plurality of component subsystems and generate a component status alert for each event;
   at least one storage device storing one or more alert dictionary databases that include domain-specific language information that identifies domain-specific language terms utilized in providing component status alerts within each of the plurality of different domains;
   a processing system coupled to the at least one storage device and the plurality of different domains; and
   a memory system that is coupled to the processing system and that includes instructions that, when executed by the processing system, cause the processing system to provide a linguistic semantic alert correlation analysis engine that is configured to:
   receive a plurality of alert catalogs that are each utilized by one of the plurality of different domains, wherein each alert catalog includes the component status alert generated by a respective domain for each event detected by that respective domain;
   classify, using the domain-specific language terms, component status alerts in each of the plurality of alert catalogs;
   determine, based on the classification of the component status alerts, that a first component status alert in a first alert catalog for a first domain included in the plurality of different domains, and a second component status alert in a second alert catalog for a second domain included in the plurality of domains, are each associated with a common component subsystem;
   correlate, based on the first component status alert and the second component status alert being associated with the common subsystem, the first component status alert and the second component status alert such that each of the first component status alert and the second component status alert are associated with the common component subsystem;
   receive each of the first component status alert generated by the first domain and the second component status alert generated by the second domain; and
   consolidate the first component status alert and the second component status alert to provide a consolidated component status alert for the common component subsystem based on a prior correlation of the first component status alert and the second component status alert being associated with the common component subsystem.

2. The system of claim 1, wherein the linguistic semantic alert correlation analysis engine is configured to:
   determine, based on the classification of the component status alerts, that a third component status alert in a third alert catalog for a third domain included in the plurality of domains is associated with the common component subsystem; and
   correlate, based on the third component status alert being associated with the common component subsystem, the first component status alert, the second component status alert, and the third component status alert such that such that each of the first component status alert, the second component status alert, and the third component status alert are associated with the common component subsystem.

3. The system of claim 1, wherein the domain-specific language information includes hardware alert classification information, operating systems alert classification information, and application alert classification information.

4. The system of claim 1, wherein the classifying the component status alerts includes classifying component status alerts into a hardware alert classification, an operating system alert classification, and an application alert classification.

5. The system of claim 1, wherein the domain-specific language information includes domain component trees that identify components utilized in each of the plurality of different domains.

6. The system of claim 5, wherein the linguistic semantic alert correlation analysis engine is configured to:
   determine that the first component status alert and the second component status alert are each associated with the common component subsystem using at least one of the domain component trees.

7. The system of claim 1, wherein the linguistic semantic alert correlation analysis engine is further configured to:
   provide the consolidated component status alert for the common component subsystem to a monitoring application that is configured to monitor each of the plurality of different domains and report component status alerts to a user.

8. An Information Handling System (IHS), comprising:
a processing system; and
a memory system that is coupled to the processing system and that includes instructions that, when executed by the processing system, cause the processing system to provide a linguistic semantic alert correlation analysis engine that is configured to:
receive a plurality of alert catalogs that are each utilized by one of a plurality of different domains, wherein each of the plurality of different domains include at least one of a hardware component or a software component, are coupled to a plurality of component subsystems, and are each configured to detect an event on each of the plurality of component subsystems and, in response, generate a component status alert for each event and enter that component status alert into a respective alert catalog;
classify, using domain-specific language terms included in domain-specific language information stored in one or more alert dictionary databases that, component status alerts in each of the plurality of alert catalogs;
determine, based on the classification of the component status alerts, that a first component status alert in a first alert catalog for a first domain included in the plurality of different domains, and a second component status alert in a second alert catalog for a second domain included in the plurality of domains, are each associated with a common component subsystem;
correlate, based on the first component status alert and the second component status alert being associated with the common component subsystem, the first component status alert and the second alert such that each of the first component status alert and the second component status alert are associated with the common component subsystem;
receive each of the first component status alert generated by the first domain and the second component status alert generated by the second domain; and
consolidate the first component status alert and the second component status alert to provide a consolidated component status alert for the common component subsystem based on a prior correlation of the first component status alert and the second component status alert being associated with the common component subsystem.

9. The IHS of claim 8, wherein the linguistic semantic alert correlation analysis engine is configured to:
determine, based on the classification of the component status alerts, that a third component status alert in a third alert catalog for a third domain included in the plurality of domains is associated with the common component subsystem; and
correlate, based on the third component status alert being associated with the common component subsystem, the first component status alert, the second component status alert, and the third component status alert such that such that each of the first component status alert, the second component status alert, and the third component status alert are associated with the common component subsystem.

10. The IHS of claim 8, wherein the domain-specific language information includes hardware alert classification information, operating systems alert classification information, and application alert classification information.

11. The IHS of claim 8, wherein the classifying the component status alerts includes classifying component status alerts into a hardware alert classification, an operating system alert classification, and an application alert classification.

12. The IHS of claim 8, wherein the domain-specific language information includes domain component trees that identify components utilized in each of the plurality of different domains.

13. The IHS of claim 12, wherein the linguistic semantic alert correlation analysis engine is configured to:
determine that the first component status alert and the second component status alert are each associated with the common component subsystem using at least one of the domain component trees.

14. A method for correlating alerts using linguistic semantic analysis, comprising:
receiving, by a linguistic semantic alert correlation analysis system, a plurality of alert catalogs that are each utilized by one of a plurality of different domains, wherein each of the plurality of different domains include at least one of a hardware component or a software component, are coupled to a plurality of component subsystems, and are each configured to detect an event on each of the plurality of component subsystems and, in response, generate a component status alert for each event and enter that component status alert into a respective alert catalog;
classifying, by the linguistic semantic alert correlation analysis system using domain-specific language terms included in domain-specific language information stored in one or more alert dictionary databases that, component status alerts in each of the plurality of alert catalogs;
determining, by the linguistic semantic alert correlation analysis system and based on the classification of the component status alerts, that a first component status alert in a first alert catalog for a first domain included in the plurality of different domains and a second component status alert for a second domain included in the plurality of domains in a second alert catalog are each associated with a common component subsystem;
correlating, by the linguistic semantic alert correlation analysis system based on the first component status alert and the second component status alert being associated with the common component subsystem, the first component status alert and the second component status alert such that each of the first component status alert and the second component status alert are associated with the common component subsystem;
receiving, by the linguistic semantic alert correlation analysis system, each of the first component status alert generated by the first domain and the second component status alert generated by the second domain; and
consolidating, by the linguistic semantic alert correlation analysis system, the first component status alert and the second component status alert to provide a consolidated component status alert for the common component subsystem based on a prior correlation of the first component status alert and the second component status alert being associated with the common component subsystem.

15. The method of claim 14, further comprising:
determining, by the linguistic semantic alert correlation analysis system based on the classification of the component status alerts, that a third component status alert in a third alert catalog for a third domain included in the plurality of domains is associated with the common component subsystem; and correlating, by the linguistic semantic alert correlation analysis system based on the third component status alert being associated with the common component subsystem, the first component status alert, the second component status alert, and the third component status alert such that such that each of the first component status alert, the second component status alert, and the third component status alert are associated with the common component subsystem.

16. The method of claim 14, wherein the domain-specific language information includes hardware alert classification information, operating systems alert classification information, and application alert classification information.

17. The method of claim 14, wherein the classifying the component status alerts includes classifying component status alerts into a hardware alert classification, an operating system alert classification, and an application alert classification.

18. The method of claim 14, wherein the domain-specific language information includes domain component trees that identify components utilized in each of the plurality of different domains.

19. The method of claim 18, further comprising:
determining, by the linguistic semantic alert correlation analysis system, that the first component status alert and the second component status alert are each associated with the common component subsystem using at least one of the domain component trees.

20. The method of claim 14, further comprising:
providing, by the linguistic semantic alert correlation analysis system, the consolidated component status alert for the common component subsystem to a monitoring application that is configured to monitor each of the plurality of different domains and report component status alerts to a user.

\* \* \* \* \*